Figure 1:
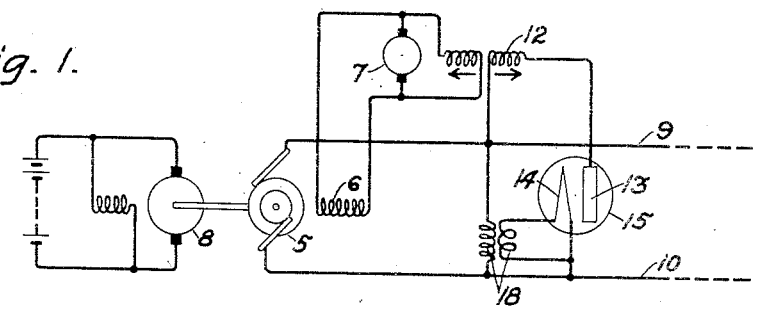

Aug. 30, 1932.  H. M. STOLLER  1,874,716
ELECTRIC REGULATOR
Filed July 24, 1919

Inventor:
Hugh M. Stoller
by　J. E. Roberts　Atty.

Patented Aug. 30, 1932

1,874,716

UNITED STATES PATENT OFFICE

HUGH M. STOLLER, OF NEW YORK, N. Y., ASSIGNOR TO WESTERN ELECTRIC COMPANY, INCORPORATED, OF NEW YORK, N. Y., A CORPORATION OF NEW YORK

ELECTRIC REGULATOR

Application filed July 24, 1919. Serial No. 313,039.

This invention relates to a novel type of regulator which is applicable in general for the regulation of electric circuits and is particularly adapted for controlling an alternating current generator in order that the voltage or frequency of the current may be regulated.

The regulator provided according to the present invention is of the thermionic type and comprises a vacuum tube containing electrodes. As is well known in the art, the cathode of a vacuum tube serves as a source of electrons that travel to the anode or plate electrode and the amount of this electron stream or space current depends upon several factors, primarily upon the temperature of the cathode, an increase in temperature producing a larger space current. It is also well known that changes in the temperature of a cathode create much more than proportional changes in the space current and consequently in the internal impedance of the tube, so that a vacuum tube may be made to respond very readily to changes in the temperature of the cathode.

In accordance with this invention a characteristic of an alternating current machine, such as the voltage, may be regulated by connecting a differential exciting winding of the exciter for the machine in circuit with the cathode and anode of the vacuum tube and by supplying the cathode with heating current which varies with the output voltage of the A. C. machine.

One way in which heating current may be made to respond to the voltage of the machine is to supply the cathode with heating current through a transformer which has one winding connected to the brushes of the machine. With such an arrangement the average value of the cathode heating current will depend on the voltage of the A. C. machine and any change in this voltage will change the impedance of the tube and the current through the auxiliary winding of the exciter so as to change the current supplied to the winding of the machine thereby counterbalancing the initial change in the voltage thereof.

This invention also contemplates regulating the frequency of the voltage generated by an alternating current generator, by employing a thermionic regulator to control the driving source of the generator. If the generator is driven by a motor, the regulator may be inserted in circuit with an exciting winding of the motor, and the cathode of the tube may be supplied with current which varies as the frequency of the generated current. One way in which the heating current may be made to respond to the frequency, is to supply the cathode with said current through a circuit tuned to a frequency preferably higher than the maximum frequency desired from said machine. The intensity of the current in this tuned circuit will depend upon the frequency of the current so that the temperature of the cathode and consequently the effective impedance of the tube will respond to variations of the frequency generated, and will regulate the speed of the driving motor so as to bring about the desired regulation.

As is well known in the art, the space current of a vacuum tube at first increases very rapidly with increase in plate voltage, but after a certain value of plate voltage, depending upon the temperature of the cathode, is reached, the space current remains substantially constant regardless of further increase in plate voltage. In utilizing a vacuum tube as a regulator, it has been found preferable to have the tube operate on that part of the curve above described where a wide variation in plate voltage will not produce any appreciable change in the space current.

The electric regulator of the thermionic type possesses many advantages over regulators of other types in that it is simple, efficient, light in weight and has no moving parts. Other advantages will be apparent from the detailed description of this invention.

Figure 2:
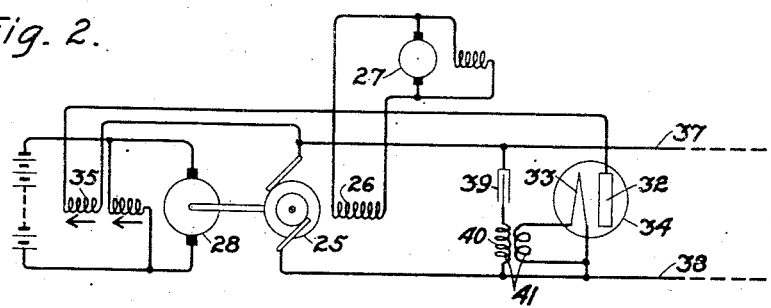
Figure 3:
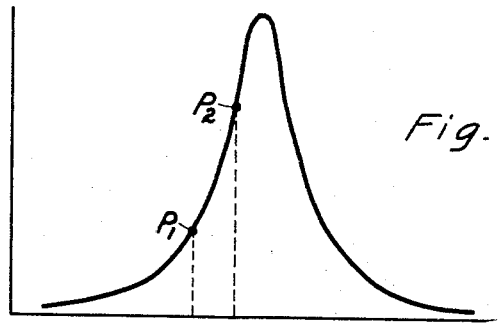

For a better understanding of this invention reference is made to the following detailed description in connection with the accompanying drawing in which Fig. 1 illustrates the thermionic regulator of this invention adapted to regulate the voltage generated by an A. C. machine; Fig. 2 illustrates how this invention may be applied to regulate the frequency of the current generated by an A. C. machine; and Fig. 3 is a curve illustrating how the current in a tuned circuit changes with the impressed frequency.

Referring to Fig. 1, 5 is an alternating current generator having a field winding 6 which is supplied with current from an exciter 7. 8 is a motor for driving the generator 5. Connected across the mains 9 and 10 of the generator 5, are the differential winding 12, the anode 13 and cathode 14 of a vacuum tube 15. The cathode 14 is supplied with heating current through a transformer 18 which has one of its windings connected to the brushes of the generator 5 and has its other winding connected to the terminals of the cathode. The average value of the heating current for cathode 14, therefore, depends upon the value of the A. C. voltage generated by machine 5, so that by this arrangement the internal impedance of tube 15 is responsive to the voltage of generator 5. If the voltage of generator 5 should increase, for example, due to a reduction in the load connected to the leads 9 and 10, the heating current for cathode 14 would consequently increase thereby decreasing by a much more than proportional amount the internal impedance of tube 15. This decrease in the tube's impedance will allow a larger current to flow through the differential winding 12 of the exciter 7, thereby decreasing the current supplied to the winding 6 of the generator 5 and restricting the increase in the generated voltage.

If, on the other hand the generated voltage should tend to decrease, the heating current for cathode 14 will decrease, thereby increasing by a much more than proportional amount the impedance of the tube 15 so as to reduce the current flowing through the differential winding 12 of exciter 7. The change in the current through the differential winding 12 will increase the current supplied to the windings 6 of the generator 5, so as to restrict the decrease in the generated voltage. It follows, therefore, that the regulator 15 will serve to hold substantially constant the voltage generated by generator 5, regardless of changes in the load with which it is associated or the speed at which it is driven.

Referring to Fig. 2, 25 is an alternating current generator having a winding 26, which is supplied with current from an exciter 27. The generator 25 is driven by a motor 28. The anode 32 and cathode 33 of the vacuum tube 34 are connected in circuit with an exciting aiding winding 35 of the motor 28, across the leads 37 and 38. Connected across the brushes of the A. C. machine 25 are a condenser 39 and a winding 40 of a transformer 41. The secondary of transformer 41 is connected to the terminals of cathode 33. The capacity of condenser 39 and the inductance of winding 40 are preferably of such values as to form a circuit tuned to a frequency higher than the maximum frequency generated by the machine 25. The heating current for cathode 33, therefore, depends upon the strength of the alternating current flowing through condenser 39 and winding 40.

As is well known in the art, the strength of the current in a circuit containing inductance and capacity, is a maximum for the frequency of current to which the circuit is tuned and decreases rapidly in value as the frequency changes to other values.

Fig. 3 illustrates a characteristic curve such as the tuned circuit containing condenser 39 and winding 40 may have. The ordinates represent various values of current while the abscissae represent the various values of the impressed frequency. As stated above, it is preferable that the condenser 39 and inductance 40 be tuned to a higher value of frequency than will be met in the operation of generator 25 so that the variation in frequency, due to changes in load, for example, would be within the range of $P_1$ and $P_2$ on this curve. As may be seen from the drawing, the curve is very steep between these two points a small increase in frequency of the generator producing a very large increase in the value of the current flowing through the tuned circuit.

The manner in which the regulation is obtained in Fig. 2 may now be described as follows:

With the condenser 39 and inductance 40 so adjusted that the frequency of the current of generator 25 has a value intermediate the points $P_1$ and $P_2$ on the characteristic curve of the circuit, suppose that the frequency of the current generated by generator 25 should suddenly increase. This increase of frequency, as shown by the above mentioned characteristic curve, would produce a much greater change in the current flowing through inductance 40. This increase in current would be impressed through transformer 41 on the cathode 33, increasing its temperature and increasing the current in the aiding winding 35 of motor 28. This change in the current through aiding winding 35 would slow down the speed of the generator 25 so as to restrict to a very small value the increase in frequency. It follows therefore, that any change in the frequency generated by generator 25 will so change the current through the aiding winding 35 of the motor 28, that the change in frequency would be restricted to a small value, thereby enabling the frequency of generator 25 to be maintained at a substantially constant value in spite of changes in the circuit conditions of the generator.

It is obvious that this invention is not limited to the particular forms above described but that they may be considerably modified without departing in any wise from the spirit of this invention as defined in the appended claims.

What is claimed is:

1. The combination with an alternating current machine, alternating current leads for said machine, and means comprising an exciting winding for controlling a characteristic of said alternating current machine, of means for holding substantially constant a characteristic of said alternating current machine, said second means comprising a unilateral thermionic device having an anode and a filamentary cathode in circuit with said exciting winding and connected to said leads, and means for varying the temperature of said cathode in substantial coincidence and according to variations in a characteristic of said alternating current machine whereby corresponding instantaneous variations are produced in the current through said exciting winding.

2. The combination with an alternating current generator and means comprising an exciting winding for controlling a characteristic of said generator, of means for holding substantially constant a characteristic of said generator, said second means comprising a unilateral thermionic device having an anode and a filamentary cathode in circuit with said exciting winding, and connected to said generator, said cathode having a plurality of external terminals, and means for varying the current through said device and said winding in substantial coincidence and accordance with variations in a characteristic of said generator, said varying means comprising a transformer having one winding associated with said generator and having another winding connected to the terminals of said cathode.

3. An alternating current machine having alternating current supply leads, means comprising an exciting winding for controlling a characteristic of said alternating current machine, a thermionic vacuum tube having a filamentary cathode, a circuit containing said alternating current machine, said winding and said tube, and means connected to said alternating current supply leads for governing the operation of said cathode to effect control of said winding in substantial coincidence and accordance with variations in the characteristic of said machine.

4. In combination, an alternating current machine, alternating current leads therefor, means comprising an exciting winding for controlling a characteristic of said machine, a thermionic vacuum tube having electrodes including a filamentary cathode for regulating a characteristic of said machine, said winding and said vacuum tube being connected in a fixed circuit across said leads and means responsive to said characteristic of the machine for supplying one of said electrodes with potential from said leads to control said device so as to effect control of said exciting winding in substantial coincidence and accordance with variations in the characteristic of the alternating current machine.

5. In combination, an alternating current machine, alternating current supply leads for said machine, a second machine for controlling a characteristic of said first machine, said second machine having a field winding, a thermionic device having a filamentary cathode responsive to changes in a characteristic of said first machine for regulating said first machine, said winding and said device being connected in series with each other and in shunt to said leads and means for supplying said cathode with heating current from the alternating current supply leads to control said device so as to effect control of said field winding in substantial coincidence and accordance with variations in the characteristic of the alternating current machine.

6. In combination, an alternating current machine, alternating current leads connected to said machine, means comprising an exciting winding for controlling the excitation of said machine, a thermionic vacuum tube containing a plurality of electrodes including a filamentary cathode, said exciting winding being connected in a fixed circuit with said tube across said leads so that changes in the tube current produce simultaneous changes in the winding current, and means responsive to a characteristic of said machine for supplying to one of said electrodes a potential which varies in substantial coincidence and accordance with changes in a characteristic of said machine whereby instantaneous change of a greater magnitude is produced in said tube current.

7. In combination, an alternating current machine, alternating current supply leads therefor, a second machine for varying a characteristic of said first machine, said second machine having a field winding, a thermionic vacuum tube having a plurality of electrodes including a filamentary cathode, said field winding and said tube being connected in shunt to said leads, and a transformer having its primary winding connected in shunt to said leads and the secondary winding connected to the terminals of said cathode for controlling said tube to effect control of said field winding in substantial coincidence and accordance with variations in the characteristic of said alternating current machine.

In witness whereof, I hereunto subscribe my name this 21st day of July A. D., 1919.

HUGH M. STOLLER.